(12) United States Patent
Cordts

(10) Patent No.: US 9,797,445 B2
(45) Date of Patent: Oct. 24, 2017

(54) BEARING

(71) Applicant: CARL FREUDENBERG KG, Weinheim (DE)

(72) Inventor: Detlef Cordts, Wandlitz (DE)

(73) Assignee: CARL FREUDENBERG KG, Weinheim (DE)

( * ) Notice: Subject to any disclaimer, the term of this patent is extended or adjusted under 35 U.S.C. 154(b) by 78 days.

(21) Appl. No.: 14/775,723

(22) PCT Filed: Jan. 31, 2014

(86) PCT No.: PCT/EP2014/000258
§ 371 (c)(1),
(2) Date: Sep. 14, 2015

(87) PCT Pub. No.: WO2014/154315
PCT Pub. Date: Oct. 2, 2014

(65) Prior Publication Data
US 2016/0010686 A1   Jan. 14, 2016

(30) Foreign Application Priority Data

Mar. 25, 2013 (DE) .................. 10 2013 005 034
Aug. 7, 2013 (DE) .................. 10 2013 013 092

(51) Int. Cl.
*F16F 5/00* (2006.01)
*F16C 32/06* (2006.01)
(Continued)

(52) U.S. Cl.
CPC ........ *F16C 32/0677* (2013.01); *F16C 27/063* (2013.01); *F16C 32/0651* (2013.01); *F16F 13/20* (2013.01)

(58) Field of Classification Search
CPC  F16C 32/0677; F16C 27/063; F16C 32/0651; F16F 13/20; B60G 7/006
(Continued)

(56) References Cited

U.S. PATENT DOCUMENTS 5,102,105 A    4/1992  Hamaekers et al.
5,374,039 A *  12/1994  Schmidt .................. B64C 27/35
                                                          137/513.3
(Continued)

FOREIGN PATENT DOCUMENTS

CN    1625661 A    6/2005
CN    1796862 A    7/2006
(Continued)

*Primary Examiner* — Pamela Rodriguez
(74) *Attorney, Agent, or Firm* — Leydig, Voit & Mayer, Ltd.

(57) ABSTRACT

A bearing with a core and a sheath which surrounds the core, wherein the core is supported against the sheath by at least one elastomer or a plurality of elastomers, wherein at least two functional chambers which contain a working fluid are formed between the core and the sheath, and wherein the functional chambers are bounded at least partially by the elastomer or elastomers, characterized, with respect to the problem of configuring a bearing in such a way that a drop in rigidity of the bearing is as small as possible at low temperatures, in that at least one equalizing chamber is provided for an equalizing fluid, from which the equalizing fluid can be diverted into the functional chambers, wherein the equalizing fluid in the equalizing chamber is separated from a gas-filled space or a plurality of gas-filled spaces by a movable or elastic separating element.

17 Claims, 10 Drawing Sheets

(51) Int. Cl.
*F16F 13/20* (2006.01)
*F16C 27/06* (2006.01)

(58) Field of Classification Search
USPC ........ 267/140.12, 140.11, 140.2, 140.5, 141,
267/141.2, 141.3, 141.7, 136, 292, 293
See application file for complete search history.

(56) References Cited

U.S. PATENT DOCUMENTS

| | | | |
|---|---|---|---|
| 5,501,434 A | 3/1996 | McGuire | |
| 6,045,328 A | 4/2000 | Jones | |
| 8,240,645 B2* | 8/2012 | Eberhard | B60G 7/006 |
| | | | 267/140.12 |
| 2003/0201590 A1* | 10/2003 | Thornhill | F16F 13/1427 |
| | | | 267/140.12 |
| 2006/0071379 A1 | 4/2006 | Kato et al. | |
| 2006/0151929 A1 | 7/2006 | Franck et al. | |
| 2006/0220448 A1* | 10/2006 | Hartel | F16F 13/28 |
| | | | 303/11 |
| 2010/0207347 A1 | 8/2010 | Han | |

FOREIGN PATENT DOCUMENTS

| | | |
|---|---|---|
| CN | 102644693 A | 8/2012 |
| DE | 3940004 A1 | 6/1991 |
| DE | 19632098 A1 | 2/1997 |
| DE | 10329982 A1 | 1/2005 |
| EP | 2620302 A2 | 7/2013 |
| GB | 2304170 A | 3/1997 |
| JP | 2000088036 A | 3/2000 |
| JP | 2004068938 A | 3/2004 |
| JP | 2006308015 A | 11/2006 |
| JP | 2012172816 A | 9/2012 |
| WO | WO 0017047 A1 | 3/2000 |
| WO | WO 2009046712 A1 | 4/2009 |

* cited by examiner

BEARING

CROSS-REFERENCE TO RELATED APPLICATIONS

This application is a U.S. national stage application under 35 U.S.C. §371 of International Application No. PCT/EP2014/000258, filed on Jan. 31, 2014, and claims benefit to German Patent Applications No. DE 10 2013 005 034.0 and DE 10 2013 013 092.1, respectively filed on Mar. 25, 2013, and Aug. 7, 2013. The International Application was published in German on Oct. 2, 2014, as WO 2014/154315 A1 under PCT Article 21(2).

FIELD

The invention relates to a bearing.

BACKGROUND

Bearings which comprise a core and a sheath surrounding said core are already known from the prior art. The core here by way of at least one elastomer or a plurality of elastomers is supported in relation to the sheath.

One functional chamber or a plurality thereof in which operating fluids are received is/are disposed between the core and the sheath. Often, the functional chambers at their axial ends are delimited by the elastomers which bond the core to the sheath.

Such bearings are referred to as hydraulic bearings and usually have two functional chambers which are closed off and interconnected, and in which in each case one operating fluid is received.

As soon as a hydraulic bearing is cooled, various coefficients of expansion of the core, of the sheath, and of the elastomers and of the operating fluid begin to display their effect.

The operating fluid in the functional chambers usually displays a substantially higher coefficient of expansion than the surrounding, substantially hard delimiting materials. These delimiting materials are usually made from metal or elastomers.

On account of cooling, a cavity or a void, respectively, which has to be equalized is created in the functional chambers. The formation of this void leads to a pressure drop in the entire bearing system.

In as far as residual air is contained post filling in the functional chambers, said residual air expands on account of the drop in pressure and provides a corresponding equalization of volume.

The more residual air received in the functional chambers, the lower the pressure drop in the bearing. However, an air bubble which is created is substantially always the same size as the loss of volume of the operating fluid.

Against this background it should be noted that the pressure in the functional chambers drops under the influence of the vapor pressure of the operating fluid, if no residual air is contained in the functional chambers. The operating fluid evaporates and fills the cavity which has been created or the void which has been created, respectively, in which case the system pressure corresponds to the vapor pressure of the operating fluid.

The behavior described above becomes more complex if very different amounts of air have been received in the two functional chambers. Asymmetrical stiffness profiles result on account thereof.

In any case, when the core deflects in relation to the sheath, first a void which has been created has to be equalized independently of the frequency or speed, respectively, of the deflection, prior to any significant increase in pressure taking place in the functional chamber. Up to this point, the bearing only has the modest bearing-spring stiffness; the higher exalted spring stiffness only begins to take effect thereafter.

SUMMARY

An aspect of the invention provides a bearing, comprising: a core; a sheath surrounding the core; at least two functional chambers, each comprising an operating fluid, each chamber being configured between the core and the sheath; and an equalization chamber, configured for an equalization fluid, wherein the core is supported in relation to the sheath, by a support comprising an elastomer, wherein the functional chambers are at least partially delimited by the support, wherein the equalization fluid can be introduced from the equalization chamber into the functional chambers, and wherein the equalization fluid in the equalization chamber is separated, by a movable separation element or elastic separation element, from at least one gas-filled space.

DETAILED DESCRIPTION

Figure 1:
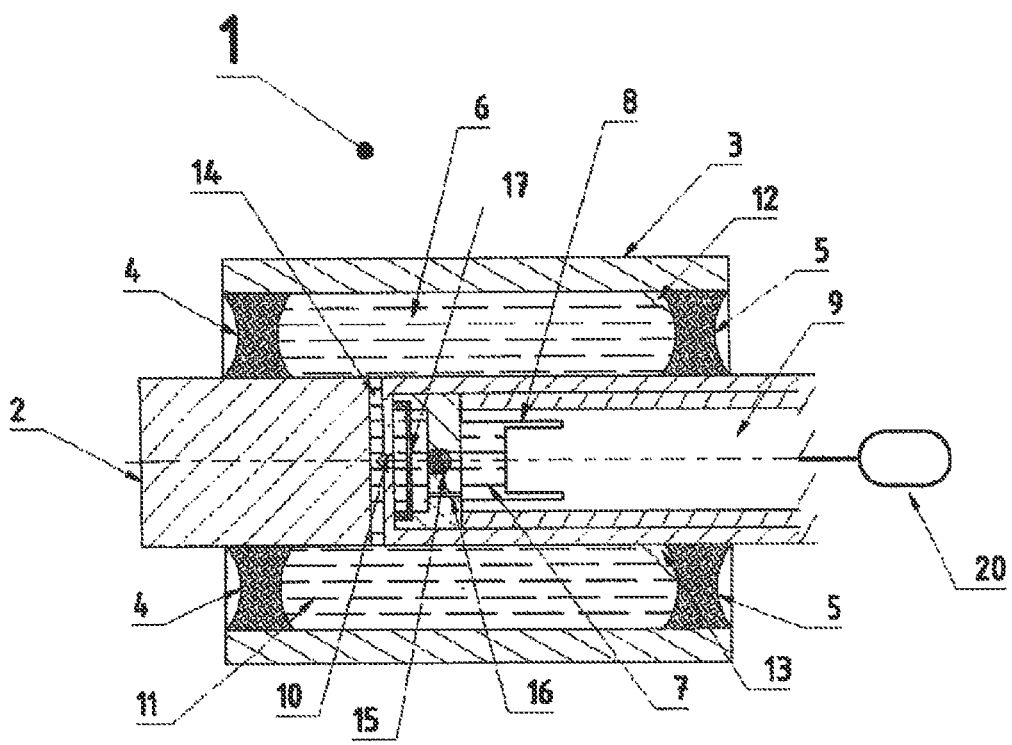
FIG. 1 shows a bearing which has an equalization chamber having a gas-filled space, wherein a thin duct terminates in a further duct.

An aspect of the invention is thus based on designing and refining a bearing of the type mentioned at the outset in such a manner that a collapse in stiffness of the bearing at low temperatures is as modest as possible.

According to an aspect of the invention it has been recognized that a collapse in stiffness at low temperatures can be avoided in that the void which is created by different coefficients of expansion is replaced by an equalization fluid.

According to an aspect of the invention it has been specifically recognized that this equalization fluid must be stored outside the functional chambers per se. On account of supplying the equalization fluid in order to fill voids, a loss in function of the hydraulic stiffening at high frequencies and/or speeds can be prevented.

According to an aspect of the invention it has been recognized in particular that as a result of process technology a certain amount of residual air always remains in the functional chambers. According to the invention, it is ensured here that the pressure within the bearing drops by only a modest amount. Otherwise, an expanding residual amount of air would lead to functional limitations.

According to an aspect of the invention, all these problems are addressed by an equalization chamber for an equalization fluid, from which the equalization fluid is introducible into a functional chamber. The equalization fluid here is separated in the equalization chamber by a movable or elastic separation element from a gas-filled space. On account of the movable or elastic separation element, the amount of the supplied equalization fluid is meterable without any problem.

To this extent, a bearing is designed such that a collapse in stiffness of the bearing at low temperatures is as modest as possible.

The equalization chamber could be connectable in a fluid-conducting manner to a connection duct of the functional chambers via a duct and a check valve. In order for the bearing to be capable of functioning, the pressure in the equalization chamber must to be as high as the static system pressure which prevails between the functional chambers and the equalization volume when the bearing is stationary. It can be determined from the pressure profiles in the functional chambers when the bearing is dynamically stressed that this static system pressure results as a minimum value of the pressure profile in the center of the connection duct. If the equalization volume is connected in such a manner via a check valve to the center of the connection duct that a potentially prevalent positive pressure in the equalization volume is reduced via this check valve when the minimum pressure in the center of the connection duct is reached, said static system pressure of the bearing which is not dynamically stressed is automatically attained in the equalization volume without external intervention.

The equalization chamber could be connectable in a fluid-conducting manner to the connection duct via a thin duct. An increasing static system pressure in the functional chambers, for example as a result of the bearing being heated, may be equalized via an additional duct between the equalization volume and the connection duct or one of the functional chambers. In the event of each pressure peak, at all times only a very modest amount of fluid may be supplied in a highly metered manner to the equalization volume through the duct which is configured so as to be very thin.

The check valve could allow a modest reflux into the equalization chamber. As an alternative to an additional thin duct, the check valve may also be conceived such that in the event of pressure peaks in the connection duct said check valve enables a very small reflux into the equalization volume.

A flow throttle or a filter could be disposed within the duct. A flow throttle could be disposed within the duct. Preferably, the duct is dimensioned such that at frequencies or speeds which are relevant to functioning at the pressures prevalent in the bearing, practically no volume flow is established and the full dynamic stiffness of the bearing is available. Nevertheless, the duct should be dimensioned in such a manner that an equalization of volume which may last for minutes or hours is ensured in the event of temperature changes in the entire bearing.

Against this background, the flow throttle could have a non-woven or woven fabric which is sandwiched between two disks which are provided with passages. On account thereof, the risk of the duct or the check valve being clogged by particles floating in the equalization fluid may be addressed. Furthermore, a flow resistance within the duct may be adjusted by way of a woven fabric or non-woven.

The flow resistance may be adjusted by a layer of a firm and tightly packed non-woven or woven fabric. The non-woven or woven fabric is supported against tilting or deflecting by way of pressure differentials by disks with passages.

Advantageously, the gas-filled space is selected so as to be so large that an equalization of volume is performed without a substantial drop in pressure. The size of the gas-filled space depends on the amount of residual air in the functional chambers after the latter have been filled, the temperature range to be expected within which equalization has to be carried out, and a permissible deviation from a characteristic curve of the bearing. Preferably, the gas-filled space displays about one to three times the volume which has to be equalized during cooling.

The separation element could be designed as a displaceable piston. The separation between the functional chambers and parts of the equalization chamber has to be gas-tight. Otherwise, undesirable gases could make their way into the functional chambers. Therefore, a sealed and axially displaceable piston is preferably employed.

Against this background, it is also conceivable for the separation element to be designed as a roller diaphragm. A roller diaphragm from elastomer, which is preferably to be provided with a fabric reinforcement, is distinguished by high elasticity. Moreover, a roller diaphragm from an elastomer is very easily clampable in such a manner within a duct that no permeable points are created.

The separation element could be designed as a foam rubber. The equalization fluid here is separated by many closed-off and gas-filled spaces, namely bubbles or cells, which are embedded in a rubber matrix. The foam rubber forms a crumple zone for a movable column of equalization fluid.

Increases in temperature may also have significant effects on the properties of a bearing. Additional volumes may arise on account of the operating fluid being heated.

These additional volumes lead to compression of the residual air which is usually received in the functional chambers and to bulging of the elastomers which support the core in relation to the sheath.

On account thereof, the pressure rises in the bearing or in a system which has such a bearing, respectively. By way of an equalization chamber in which an equalization fluid is provided, additional volumes created by heating can be compensated for, wherein the equalization fluid in the equalization chamber is separated by a movable or elastic separation element from a gas-filled space.

The additional pressure which is created by the additional volumes conveys operating fluid into the equalization chamber, compressing the gas in the gas-filled space. Therefore, the increase in pressure in the bearing is substantially more modest. Preferably, the operating fluid and the equalization fluid are materially identical.

FIG. 1 shows a bearing 1, comprising a core 2 and a sheath 3 surrounding said core 2, wherein the core 2 by way of at least one elastomer 4, 5 or a plurality of elastomers 4, 5 is supported in relation to the sheath 3, wherein at least two functional chambers 6 and 11 which contain an operating fluid are configured between the core 2 and the sheath 3, and wherein the functional chambers 6, 11 are at least partially delimited by the elastomer or elastomers 4, 5. The at least two functional chambers 6 and 11 are connected in a fluid-conducting manner by way of a connection duct 14.

At least one equalization chamber 7 for an equalization fluid is provided, from which equalization chamber 7 the equalization fluid is introducible into the functional chambers 6 and 11, wherein the equalization fluid in the equalization chamber 7 is separated by a movable or elastic separation element 8 from a gas-filled space 9.

The equalization chamber 7 is connected in a fluid-conducting manner to a connection duct 14 of the two functional chambers 6, 11 via a duct 10. A check valve 15 is disposed within the duct 10.

A flow throttle 17 is disposed within the duct 10. The flow throttle 17 could have a non-woven or woven fabric which is sandwiched between disks which are provided with passages.

Figure 2:
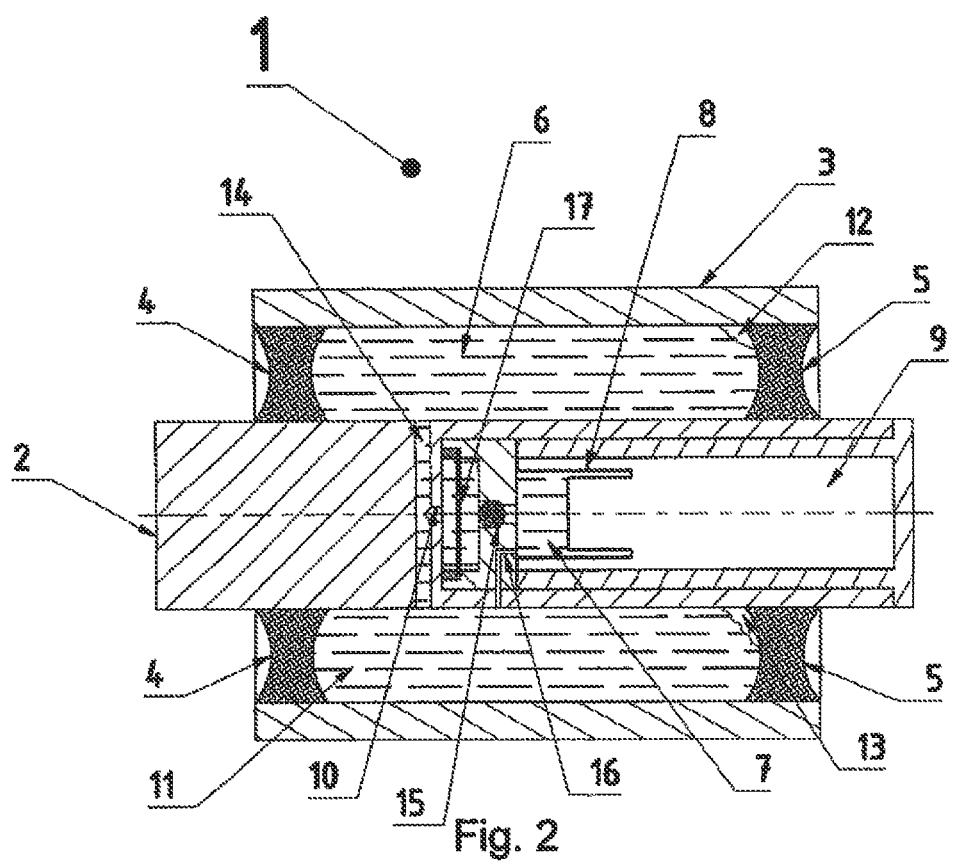
FIG. 2 shows a bearing which has an equalization chamber having a gas-filled space, wherein a thin duct terminates in a functional chamber.

Additionally, the equalization chamber 7 is connected in a fluid-conducting manner to the duct 10 and/or the connection duct 14 and/or one or a plurality of functional chambers 6, 11 by way of a very thin duct 16, as is illustrated in FIG. 2.

Figure 3:
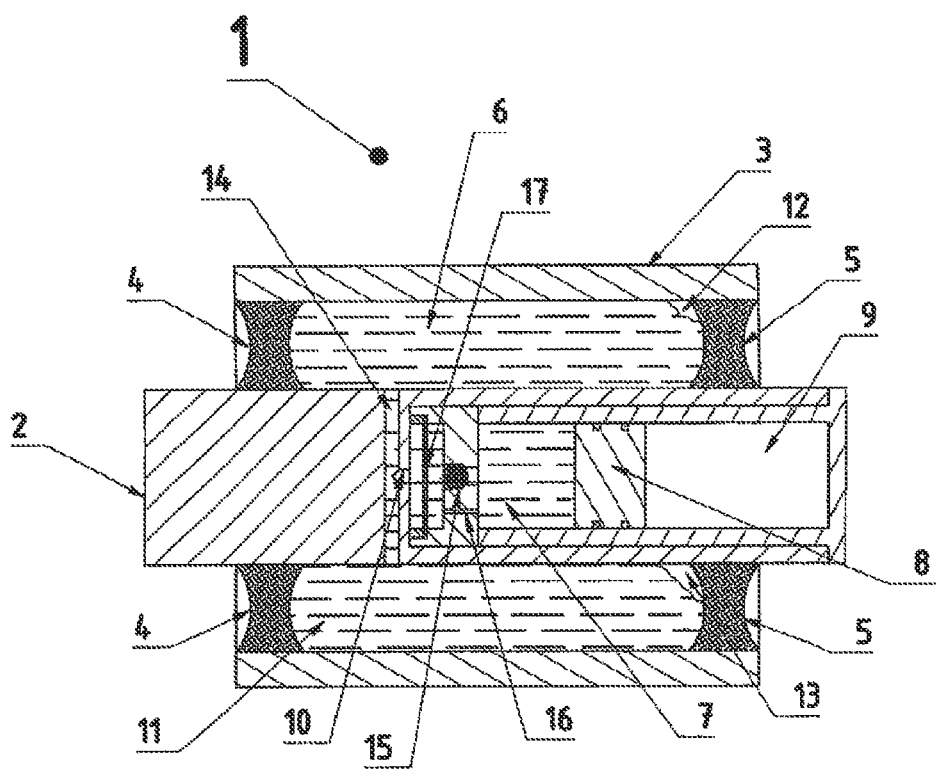
FIG. 3 shows a bearing which has an equalization chamber having a gas-filled space, wherein a separation of the fluid from the gas is performed by a separation piston.

FIG. 3 shows that the separation element 8 is designed as a displaceable piston. The separation element 8 could also be designed as a roller diaphragm.

In the exemplary embodiments of the bearing 1 which are specifically illustrated, two functional chambers 6, 11 which are both filled with operating fluid are provided. Amounts of residual air 12, 13 which are created when the functional chambers 6, 11 are filled with operating fluid are received in the functional chambers 6, 11.

When the functional chambers 6, 11 are stressed by a movement in the direction x, the pressure in the functional chamber 6 is increased while the pressure in the functional chamber 11 is reduced. The two changes in pressure concordantly act as a counterforce to the direction of movement x.

The pressure in the functional chamber 6 in theory may increase to any arbitrary level, however in the functional chamber 11 in principle may not drop below the vapor pressure of the operating fluid. Total stiffness may be enhanced by way of high preliminary pressures in the bearing system.

Figure 4:
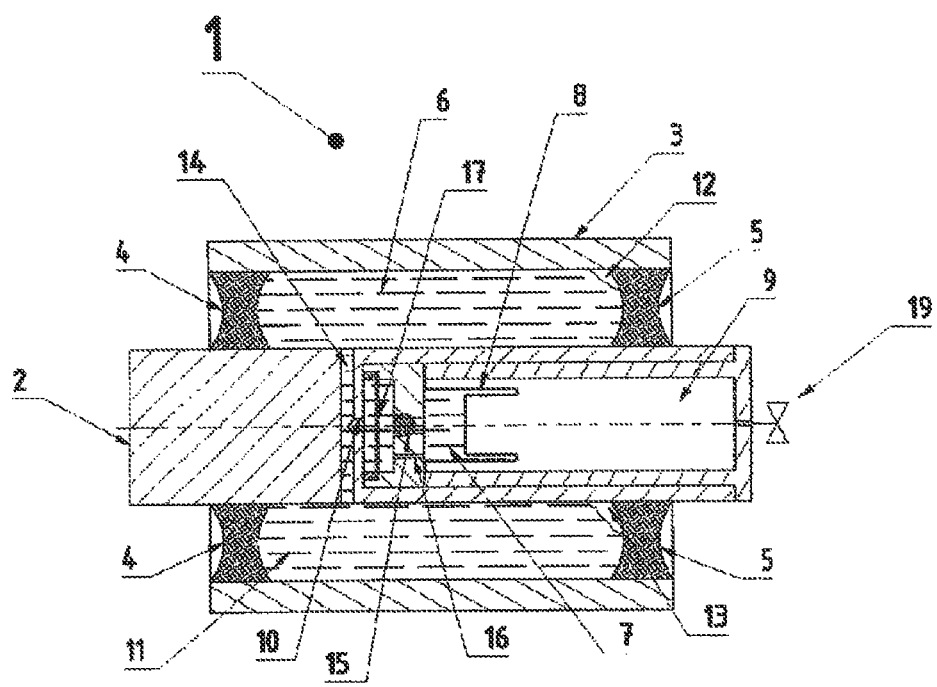
FIG. 4 shows a bearing which has an equalization chamber having a gas-filled space and which is equipped with a valve for filling/controlling the pressure in the gas-filled space of the equalization chamber.

On account thereof, it is possible for the dynamic stiffness of the bearing 1 to be actively or passively controlled by regulating the pressure in the gas-filled space 9 via a valve 19, which is shown in FIG. 4.

Against this background, many passive regulating systems for equalizing temperature are conceivable. A bi-metal spring which acts on a pressure reservoir could be used. Expansion bodies could be used for compensating for volumetric changes. These expansion bodies would have to display negative coefficients of expansion.

Figure 5:
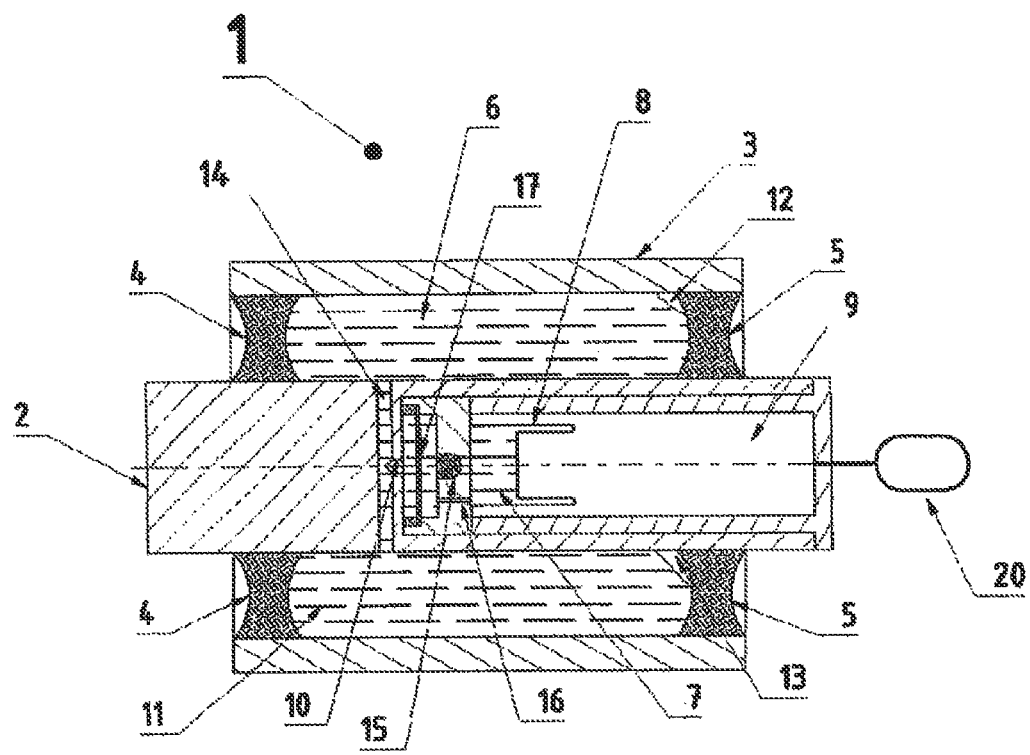
FIG. 5 shows a bearing which has an equalization chamber having a gas-filled space and which is equipped with an additional large external reservoir, in order to increase the volume of the gas-filled space.

A reservoir 20 which is tapped into and is regularly filled is provided in FIG. 5. This could potentially be performed by dynamic processes in the bearing system per se. A lowering of pressure could be performed. A pressure relief valve could be opened toward the reservoir, in order to again increase pressure. In the event of an increase in pressure a pressure relief valve which leads to a further reservoir, in particular to the environment, and which releases pressure may be provided.

In a purely passive design, a very large reservoir with a very large volume could make available an almost constant pressure. In the case of a suitable conception of the volume of the large reservoir in relation to the volumetric differentials in the functional chambers, a lowering of pressure could compensate for precisely the stiffening of the elastomers when the temperature is lowered. Likewise, compensating for the decrease in the modulus of the elastomer when the temperature increases is conceivable.

The bearing could be used as a hydraulic bearing, in particular as a hydraulic axle guide bearing. The bearing could be used in rail vehicles as a hydraulic axle guide bearing.

Moreover, it is possible for hydro bearings to be equipped with a specific preliminary pressure, in order to influence a characteristic curve without increasing susceptibility to temperature.

An amount of residual air in a functional chamber can be dramatically increased in a targeted manner. In this way, the parasitic effect of the amounts of residual air may be used as means for designing the characteristic curves.

Figure 6:
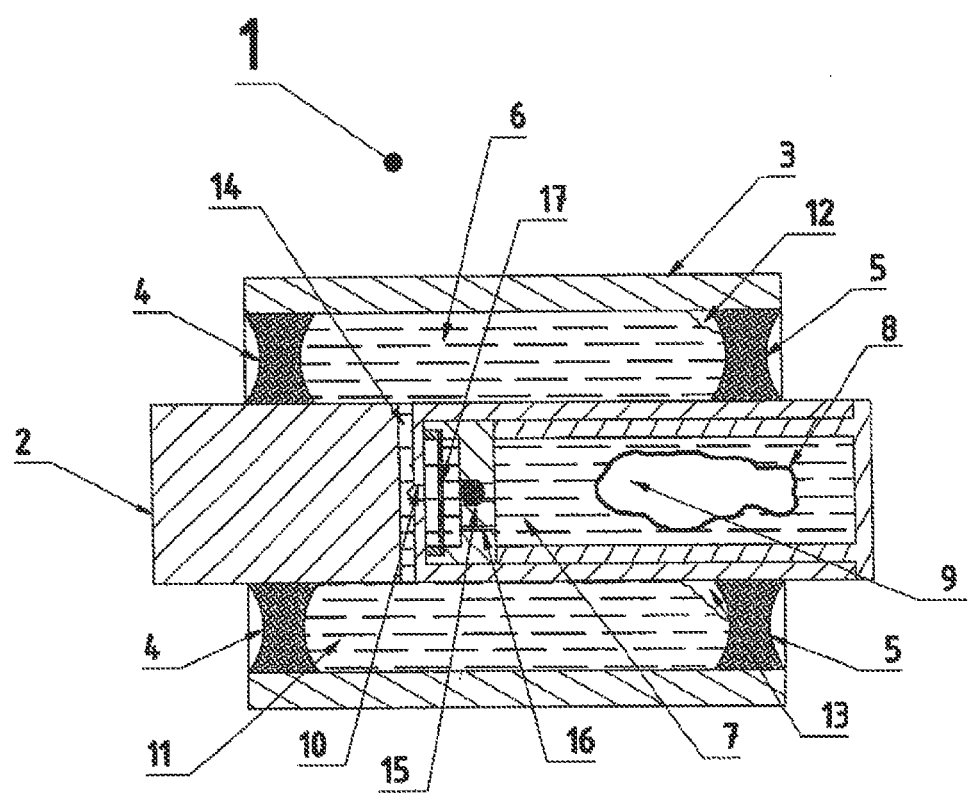
FIG. 6 shows a bearing in which in a very general manner a delimited and gas-filled space is illustrated.

FIG. 6 shows a bearing 1 in which the gas-filled space 9 is delimited in a very general manner. This may be implemented by a bellows, an elastic bladder, or similar.

Figure 13:
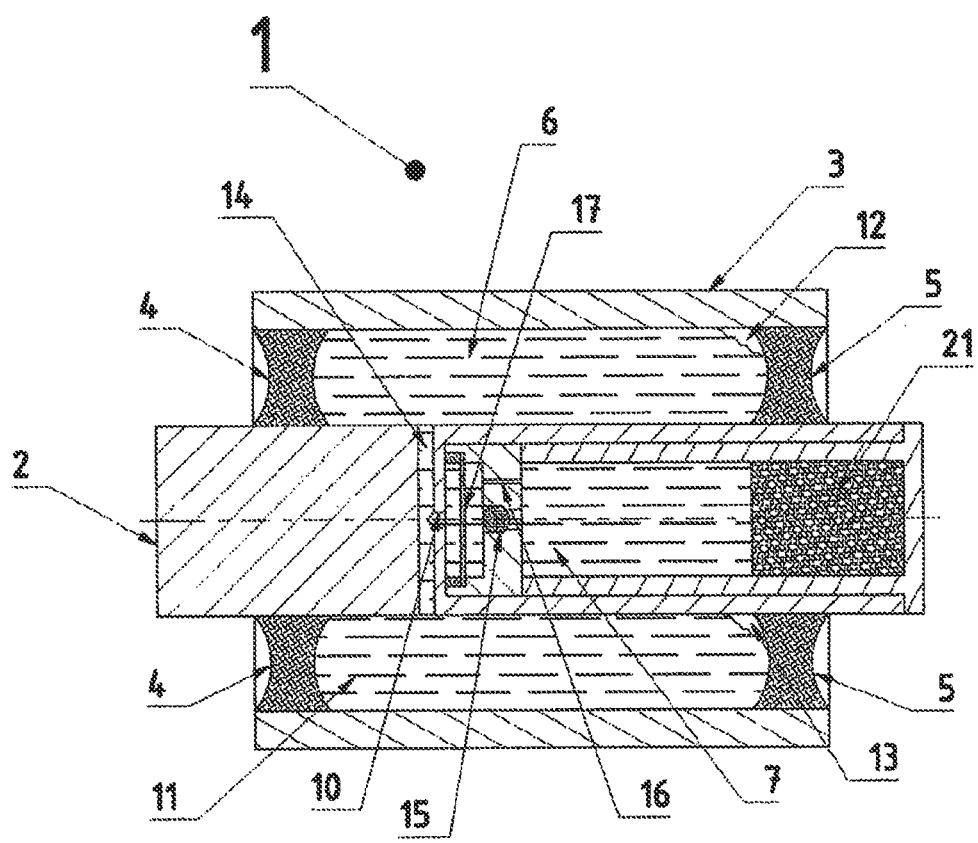
FIG. 13 shows a bearing in which the equalization chamber is designed so as to have a foam rubber.

FIG. 13 shows a bearing 1, comprising a core 2 and a sheath 3 surrounding said core 2, wherein the core 2 by way of at least one elastomer 4, 5 or a plurality of elastomers 4, 5 is supported in relation to the sheath 3, wherein at least two functional chambers 6 and 11 which contain an operating fluid are configured between the core 2 and the sheath 3, and wherein the functional chambers 6 and 11 are at least partially delimited by the elastomer or elastomers 4, 5. The at least two functional chambers 6 and 11 are connected in a fluid-conducting manner by way of a connection duct 14.

At least one equalization chamber 7 for an equalization fluid is provided, from which equalization chamber 7 the equalization fluid is introducible into the functional chambers (6, 11), wherein the equalization fluid in the equalization chamber 7 is separated by an elastic separation element 21 from a plurality of gas-filled spaces.

Specifically, the separation element 21 is designed as a foam rubber. Here, the equalization fluid is separated by many closed-off and gas-filled spaces, namely bubbles or cells, which are embedded in a rubber matrix.

Figure 7:
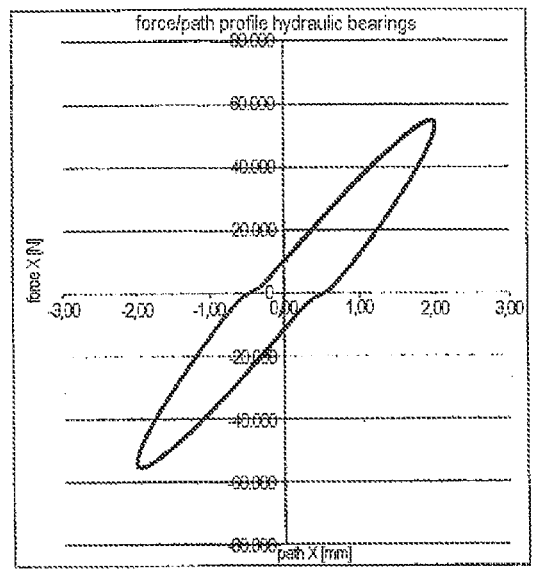
FIG. 7 shows a diagram which shows the force/path profile of a bearing having modest amounts of residual air at room temperature.

FIG. 7 shows a graph of a force/path profile as a function of force of the bearing 1 having modest amounts of residual air at room temperature.

Figure 8:
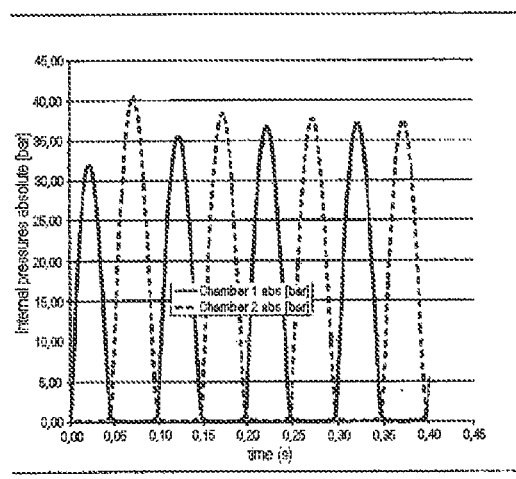
FIG. 8 shows a diagram which illustrates the profile of the pressures in the functional chambers, wherein a profile is illustrated at room temperature, unstressed at 1 bar absolute, at 2 mm amplitude.

FIG. 8 shows a graph of the internal absolute pressures in the functional chambers 6 and 11 as a function of time, at room temperature, unstressed at one bar absolute and two mm amplitude.

Figure 9:
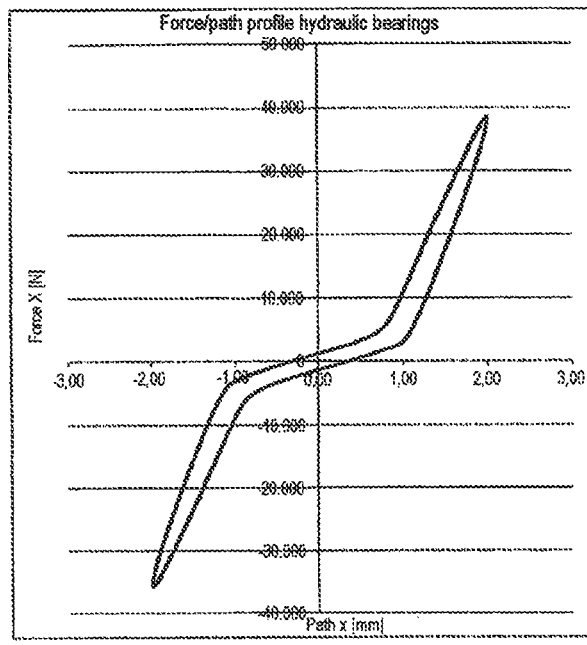
FIG. 9 shows a diagram which shows the force/path profile of a bearing having modest amounts of residual air in the functional chambers, at minus 20° C.

FIG. 9 shows a graph of a force/path profile as a function of force of the bearing 1 having modest amounts of residual air in the functional chambers 6 and 11, at minus 20° C.

Figure 10:
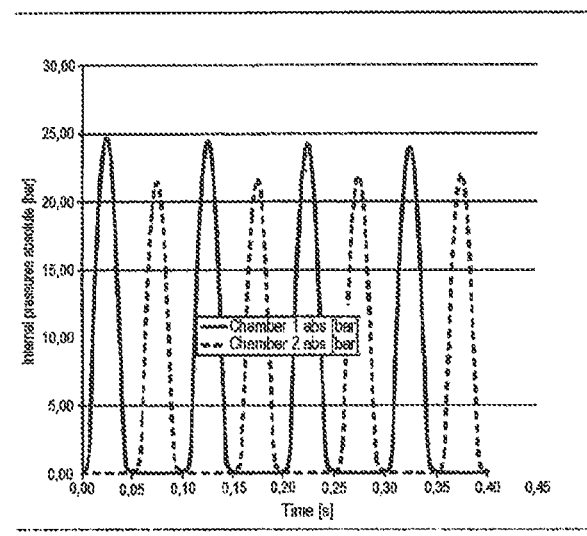
FIG. 10 shows a diagram which shows the profile of the pressures in the functional chambers at minus 20° C., unstressed at 1 bar absolute, at 2 mm amplitude.

FIG. 10 shows a graph of the internal absolute pressures in the functional chambers 6 and 11 as a function of time, at room temperature, unstressed at one bar absolute and two mm amplitude.

Figure 11:
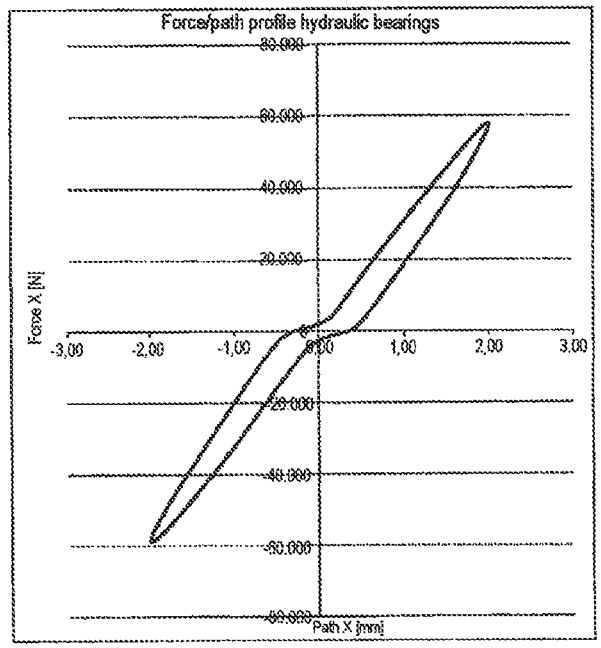
FIG. 11 shows a diagram which illustrates the force/path profile of a bearing having an equalization chamber, at minus 20° C., wherein the equalization volume equalizes about double the temperature diminution.

FIG. 11 shows a graph of a force/path profile as a function of force of the bearing 1 having an equalization chamber 7, at minus 20° C., wherein the equalization volume equalizes about double the temperature diminution.

Figure 12:
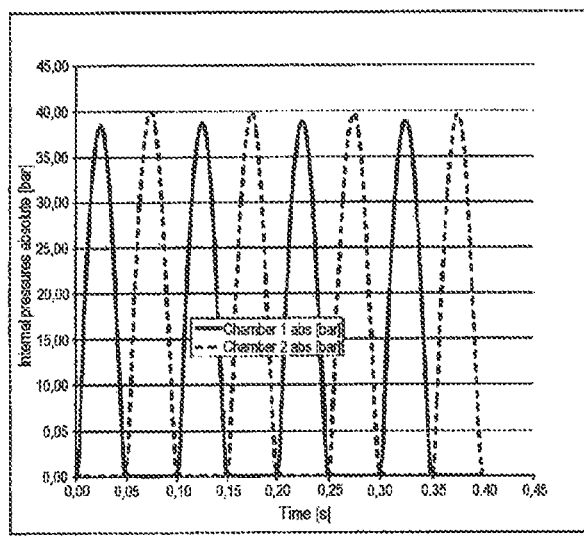
FIG. 12 shows a diagram which illustrates the profile of the pressures in the functional chambers at minus 20° C., wherein an equalization volume of the equalization chamber may compensate for about double the temperature diminution.

FIG. 12 shows a graph of the internal absolute pressures in the functional chambers 6 and 11 as a function of time, at minus 20° C., wherein an equalization volume of the equalization chamber 7 may compensate for about double the temperature diminution.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A bearing, comprising:
a core;
a sheath surrounding the core;
at least two functional chambers, each comprising an operating fluid, each chamber being disposed between the core and the sheath; and
an equalization chamber, configured for an equalization fluid,
wherein the core is supported in relation to the sheath, by a support comprising an elastomer,
wherein the functional chambers are at least partially delimited by the support,
wherein the equalization fluid can be introduced from the equalization chamber into the functional chambers,
wherein the equalization fluid in the equalization chamber is separated, by a movable separation element or elastic separation element, from at least one gas-filled space, and
wherein the equalization chamber is configured to be connected, in a fluid-conducting manner, to a connection duct of the functional chambers via a duct and a check valve, the check valve being positioned along the duct between the equalization chamber and the connection duct.

2. The bearing of claim 1, wherein the equalization chamber is configured to be connected, in a fluid-conducting manner, to the connection duct via a thin duct.

3. The bearing of claim 1, wherein the check valve allows a modest reflux into the equalization chamber.

4. The bearing of claim 1, further comprising:
a flow throttle or a filter, disposed within the duct.

5. The bearing of claim 4, wherein the flow throttle comprises a non-woven fabric which is sandwiched between disks provided with passages.

6. The bearing of claim 4, wherein the flow throttle comprises a woven fabric which is sandwiched between disks provided with passages.

7. The bearing of claim 1 wherein the separation element comprises a displaceable piston.

8. The bearing of claim 1 wherein the separation element comprises a foam rubber.

9. The bearing of claim 1, wherein the support comprises more than one elastomer.

10. The bearing of claim 1, wherein the equalization fluid in the equalization chamber is separated by the movable separation element.

11. The bearing of claim 10, wherein the movable separation element is elastic.

12. The bearing of claim 1,
wherein the equalization fluid in the equalization chamber is separated, by the movable element or elastic separation element, from more than one gas-filled space.

13. The bearing of claim 1, wherein the equalization fluid in the equalization chamber is separated from more than one gas-filled space.

14. The bearing of claim 1, further comprising:
a flow throttle, disposed within the duct.

15. The bearing of claim 1, further comprising:
a filter, disposed within the duct.

16. The bearing of claim 1, wherein the separation element is a displaceable piston.

17. The bearing of claim 1, wherein the separation element is a foam rubber.

* * * * *